S. G. Jones.
Harrow.
N° 91,024. Patented Jan. 8, 1869.
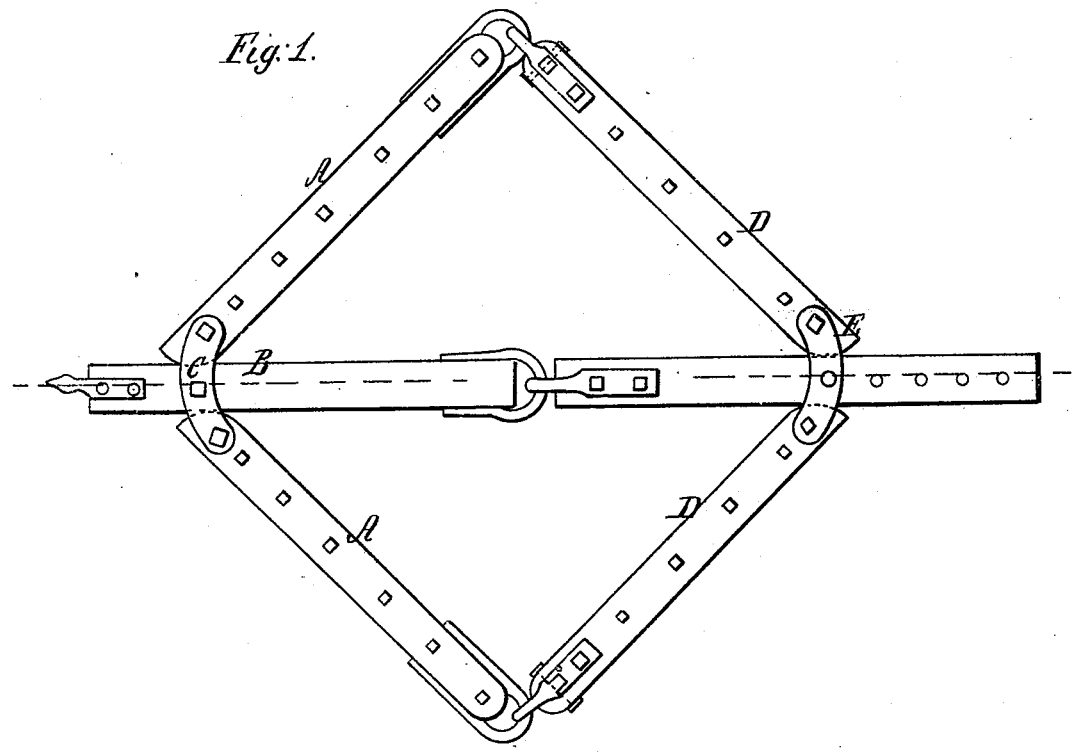
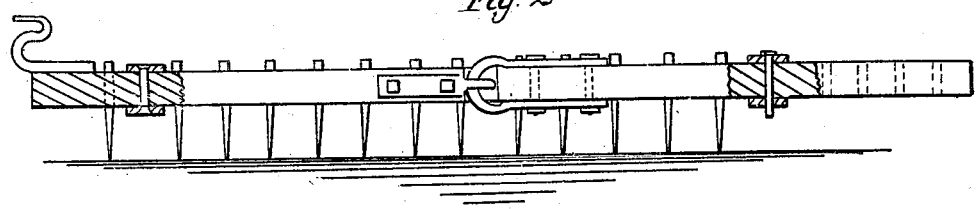

UNITED STATES PATENT OFFICE.

SAMUEL G. JONES, OF NIANTIC, ILLINOIS.

IMPROVEMENT IN HARROWS.

Specification forming part of Letters Patent No. 91,024, dated June 8, 1869.

*To all whom it may concern:*

Be it known that I, SAMUEL G. JONES, of Niantic, in the county of Macon and State of Illinois, have invented a new and Improved Harrow; and I do hereby declare that the following is a full, clear, and exact description thereof, which will enable others skilled in the art to make and use the same, reference being had to the accompanying drawings, forming part of this specification.

This invention relates to improvements in harrows, designed to provide a harrow capable of being contracted or expanded in the direction of its breadth, to change the teeth for different kinds of work; also for folding to occupy but little space in storing.

Figure 1 represents a plan view of my improved harrow, and Fig. 2 represents a longitudinal section of the same.

Similar letters of reference indicate corresponding parts.

The lateral beams A are hinged to the central draft-beam, B, by links C, permanently secured to the said central beam. These lateral arms are jointed at their outer ends to other lateral beams, D, jointed at their inner ends to a link device, E, capable of sliding on the central beam, for adjustment at any desired point by a bolt passing through holes in the said link and beam.

By moving the link E in one direction, the lateral beams are expanded and the teeth act upon the ground in lines more distant from each other, and by moving in the other direction the said teeth are caused to act more closely together.

I prefer to make the central beam in two parts, and joint them at or near the center, thereby giving the teeth-arms more freedom to vibrate.

Having thus described my invention, I claim as new and desire to secure by Letters Patent—

The forward link C, adjustable link E, and the central bar, B, formed in two parts hinged together, in combination with the pivoted toothed arms A D, hinged together at their outer ends, all arranged as described, for the purpose specified.

SAMUEL G. JONES.

Witnesses:
   CORNELIUS JONES,
   LINDSEY C. FARNAM.